United States Patent Office 3,023,229
Patented Feb. 27, 1962

3,023,229
MICROBIOLOGICAL AROMATIZATION OF STEROIDS
Robert D. Muir, Deerfield, and Raymond M. Dodson, Park Ridge, Ill., assignors to G. D. Searle & Co., Chicago, Ill., a corporation of Delaware
No Drawing. Filed Sept. 8, 1958, Ser. No. 759,412
6 Claims. (Cl. 260—479)

This invention relates to the microbiological conversion of steroids and more particularly relates to a microbiological process for the production of products containing an aromatic ring from nonaromatic steroids by means of microorganisms of the class Schizomycetes preferably of the orders Eubacteriales and Actinomycetales. More specifically it has been found that Pseudomonas, Arthrobacter and Nocardia have high activity in the microbiological conversion of this invention. Specific species of these organisms suitable for the purposes of the invention are *Pseudomonas dacunhae, Pseudomonas cruciviae, Arthrobacter simplex* and *Nocardia corallino*.

In the practice of this invention, the conversion may be effected in a growing culture of the microorganisms by either adding the steroid precursor to the culture during the incubation period, or including it in the nutrient medium prior to inoculation. Assimilable sources of nitrogen and carbon should be present in the culture medium. Also an adequate sterile air supply should be maintained during the conversion, for example, by the conventional techniques of exposing a large surface of medium or by passing air through a submerged culture.

As the steroid substrate, androstenedione, or one of its derivatives such as 1,4-androstadiene-3,17-dione, 19-hydroxyandrostenedione, testosterone and the like may be used.

Sources of nitrogenous growth promoting factors are those normally employed in such processes. They may be natural organics such as soy bean meal, corn steep liquor, meat extract, peptone and/or distillers solubles, or synthetics such as nitrates and ammonium compounds. Suitable energy-source material which may be utilized in the process of this invention include meat extract, peptone, and the like which also serve as nitrogen source or other conventional carbon containing materials such as carbohydrates of the type of glycerol, glucose, fructose, dextrose, sucrose, lactose, maltose, dextrines, starches and whey. These materials may be used either in purified state or as concentrates such as whey concentrate, corn steep liquor, grain mashes and the like, or as mixtures of the above. The steroids may be added to the culture during the incubation period or included in the medium prior to sterilization or inoculation. The preferred, but not limiting range of concentration of the steroid in the culture is about 0.025% to 0.1%. The time interval required for the action of the enzymatic system of the microorganisms employed may vary considerably, the range of about 2 to 96 hours being practical but not limiting.

The nature of the products formed during the conversion varies somewhat with the conditions employed and the time during which the steroid substrate is subjected to the enzymatic system. Evidence indicates that hydroxylation in the 9-position and dehydrogenation of positions 1 and 2 occur as intermediate, but not necessarily as seriatim or concurrent steps.

Any $\Delta^{1,4}$-dehydro-9-hydroxy-3-oxosteroid so formed, may rearrange, either spontaneously or under the influence of an enzyme system of the microorganism, to a 9-oxo-9,10-seco-1,3,5(10)-estratriene derivative. The formation of the 9-oxo-9,10-seco-1,3,5(10)-estratriene derivative does not necessarily depend on the intermediate formation of a $\Delta^{1,4}$-dehydro-9-hydroxy-3-oxo steroid since possible intermediates in the microbiological formation of the latter may also rearrange to a 9,10-secoestratriene derivative.

An especially interesting and useful transformation is the conversion of 19-hydroxyandrostenedione to estrone.

The 9,10-secoestratriene derivatives of this invention are estrogenic substances. They also are converted to 1-hydroxy-4-methylestratetraenes; for example on treating with acid 9,10-seco-3-acetoxy-1,3,5(10)-androstatriene-9,17-dione gives 1-hydroxy-4-methyl-1,3,5(10),9(11) estratetraen-17-one.

The examples which follow illustrate the invention in greater detail. It is to be understood that these examples are presented by way of illustration and not of limitation. Temperatures are expressed in degrees centigrade (° C.). Quantities are expressed in parts by weight and parts by volume which bear the same relation one to another as kilograms to liters.

The examples below are presented in two parts relating respectively to the microbiological and chemical procedures. The microbiological portions of the examples are grouped under the heading "Microbiological Procedures" and individual illustrations labelled Preparation A, Preparation B etc. Preparation A is described in detail. Preparations B through G inclusive are presented in tabular form, the modifications from Preparation A being indicated. The chemical processing is described in numbered examples appropriately cross-referenced with the respective microbiological preparations.

MICROBIOLOGICAL PROCEDURES

Preparation A

*Preparation of Inoculant.*—A medium consisting of 6 parts by weight of commercial beef extract, 10 parts by weight of commercial peptone and 2000 parts by volume of distilled water is sterilized by heating to a temperature of about 110–120° for one hour, cooled, and inoculated with a culture of Pseudomonas sp. (ATCC No. 13263). The mixture is incubated for about 72 hours at a temperature of about 25°.

*Growth phase.*—A medium consisting of 75 parts by weight of commercial beef extract, 125 parts by weight of commercial peptone, 25 liters of tap water and 2.5 parts by weight of a silicone anti-foaming agent is mixed in a stainless steel fermentor and sterilized by the addition of live steam under pressure to a temperature of about 110° to 120° and a final volume of about 30,000 parts by volume. To the resulting sterile medium is added 2000 parts by volume of inoculant prepared as described above. The mixture is agitated mechanically while introducing sterile air at a rate of about 5000 parts by volume per minute. The microorganism is permitted to grow under these conditions for about 24.5 hours at a temperature of 25°. After the growth phase of the microorganism is completed, a solution of 10 parts by weight of androstenedione in 250 parts by volume of acetone is added and the fermentation continued for an additional 24 hours. The mixture is extracted successively with two 18,000 parts by volume portions of methylene chloride for about one and one-half hours. The combined methylene chloride extracts are concentrated in vacuo to a volume of about 500 parts by volume. Further processing of the concentrate is described below in Example I.

Preparation B to Preparation G Inclusive

Preparations B through G inclusive are carried out as described in Preparation A. The conditions and modifications used in these preparations are given in the table below:

| Preparation No. | B | C | D | E | F | G |
|---|---|---|---|---|---|---|
| Preparation of inoculant: | | | | | | |
| Organism | (1) | (1) | (2) | (3) | (4) | (5) |
| Medium, parts/weight | | | | (7) | | |
| Beef extract | 6 | 6 | 6 | | 75 | 6 |
| Peptone | 10 | 10 | 10 | | 125 | 10 |
| Dist. water [9] | 2 | 2 | 2 | | 30 | 2 |
| Defoamer | | | | | 10 | |
| Time, hrs. | 72 | 72 | 72 | 72 | 21 | 72 |
| Temp. (° C.) | 25 | 25 | 25 | 25 | 25 | 25 |
| Growth phase: | | | | | | |
| Medium, parts/weight | (6) | | | (7) | | (8) |
| Beef extract | | 75 | 75 | | 300 | 75 |
| Peptone | | 125 | 125 | | 500 | 125 |
| Water [9] | | 25 | 25 | | 250 | 25 |
| Defoamer | | 5 | 5 | 5 | 30 | 5 |
| Air [10] | 5 | 5 | 5 | 10 | 30 | 10 |
| Temp | 25 | 25 | 25 | 25 | 25 | 25 |
| Time, hrs | 34 | 17 | 17½ | 62½ | 17 | 65½ |
| Fermentation phase: | | | | | | |
| Androstenedione | 10 | 10 | 10 | 10 | 100 | |
| Acetone | 300 | 250 | 350 | 300 | 1,200 | |
| Temp. (° C.) | 25 | 25 | 25 | 25 | 25 | |
| Time, hrs | 15½ | 7 | 7 | 10½ | 6½ | |
| Extraction: | | | | | | |
| $CH_2Cl_2$ [11] | 2 x 18 | 2 x 12 | 18 | 18 | 2 x 100 | 15 |
| Parts/volume after conc. | 700 | 250 | 850 | 570 | 650 | 430 |
| Further processing see Ex. No. | II | II | III | IV | V | VI |

[1] Pseudomonas dacunhae, ATCC 13261.
[2] Arthrobacter simplex, ATCC 13260.
[3] Nocardia corallina, ATCC 13258.
[4] Pseudomonas cruciviae, ATCC 13262.
[5] Nocardia corallina, ATCC 13259.
[6] The composition of the medium in preparation B is as follows:

| | |
|---|---|
| Ammonium nitrate parts by weight | 30 |
| Dibasic potassium phosphate do | 7.5 |
| Magnesium sulfate heptahydrate do | 7.5 |
| Sodium chloride do | 0.5 |
| Ferrous chloride do | 0.003 |
| Manganese sulfate do | 0.003 |
| Commercial dextrose do | 30 |
| Tap water parts by volume | 25,000 |

[7] The medium used in Preparation E for the preparation of the inoculant and for the growth phase consists of:

| | |
|---|---|
| Pancreatic digest of casein parts by weight | 204 |
| Yeast extract do | 70 |
| Dextrose do | 70 |
| Sodium chloride do | 35 |
| l-cystine do | 6.8 |
| Agar do | 10.2 |
| Resazurin do | 0.0135 |
| Thioglycollic acid parts by volume | 4.08 |
| Tap water do | 25,000 |

[8] 10 parts by weight of androstenedione are added with the ingredients of the medium for the growth phase.
[9] The quantity of water is expressed in parts by volume. The figures stated are to be multiplied by 1,000.
[10] The quantity of sterile air passed through the medium is expressed in parts by volume. The figures stated are to be multiplied by 1,000.
[11] The quantity of methylene chloride is expressed in parts by volume. The figures stated are to be multiplied by 1,000. Multiple extractions are indicated by e.g. 2 x 18.

CHEMICAL PROCEDURES

Example I

The methylene chloride solution from Preparation A is decolorized with activated carbon and the solvent removed in vacuo. The residue is dissolved in 100 parts by volume of benzene and chromatographed over 1000 parts by weight of silica gel. The chromatographic column is washed successively with 8000 parts by volume of benzene, 10,000 parts by volume of 2% ethyl acetate in benzene, 10,000 parts by volume of 5% ethyl acetate in benzene and 11,000 parts by volume of 10% ethyl acetate in benzene. The column is eluted with 18,000 parts by volume of 15% ethyl acetate in benzene. The solvents are removed from the eluate and the residue dissolved in ether and the ether solution extracted successively with four 100 part by volume portions of 5% aqueous sodium hydroxide solution. The aqueous extract is filtered, acidified with hydrochloric acid and the oily residue recovered, scratched and allowed to stand to induce crystallization. The crystalline residue thus obtained is crystallized from a mixture of ether and acetone and then from ether to yield 9,10-seco-3-hydroxy-1,3,5(10)-androstatriene-9,17-dione which melts at about 123.5–125°, exhibits an extinction coefficient of about 2320 at about 280 millimicrons and has a specific rotation of about +100.5° in chloroform.

The chromatographic column is eluted further with 8000 parts by volume of 20% ethyl acetate in benzene, 6000 parts by volume of 25% ethyl acetate in benzene and with 12,000 parts by volume of 30% ethyl acetate in benzene. The solvents are removed from the 30% eluate in vacuo and the residue dissolved in ether, the resulting ether solution extracted with 20 parts by volume of 5% aqueous potassium hydroxide solution. The alkaline extract is acidified and the oily residue crystallized from ether to yield 9,10-seco-3,17-dihydroxy-1,3,5(10)-androstatrien-9-one which melts at about 133–134°; exhibits an extinction coefficient of about 2600 at about 279 millimicrons and has a specific rotation of about +15.9° in chloroform.

The chromatographic column is eluted with 4000 parts by volume of 50% ethyl acetate in benzene and with 10,000 parts by volume of 60% ethyl acetate in benzene. The solvents are removed from the 60% eluate in vacuo and the residue crystallized from ether to yield 11α-hydroxyandrostenedione which melts at about 212–216° and exhibits an extinction coefficient of about 16,500 at about 240.5 millimicrons.

The chromatographic column is eluted further with 8000 parts by volume of 70% ethyl acetate in benzene. The solvents are removed from the eluate, the residue thus obtained crystallized from acetone-cyclohexane and then from dilute methanol to yield 7β-hydroxyandrostenedione which melts at about 221–225°.

Example II

The methylene chloride extracts from Preparations B and C are combined and the solvent removed by distillation in vacuo. The residue is dissolved in 500 parts by volume of ether and the resulting ether solution extracted with 5% aqueous sodium hydroxide solution. The alkaline extract is acidified with hydrochloric acid and the oily residue which forms is stirred to induce crystallization and recovered by filtration. The solid material thus obtained is crystallized from ether to yield 9,10-seco - 3 - hydroxy - 1,3,5(10) - androstatriene - 9,17-dione melting at about 120–122°.

A solution of 2.2 parts by weight of 9,10-seco-3-hydroxy-1,3,5(10)-androstatriene-9,17-dione, 5 parts by volume of acetic anhydride and 5 parts by volume of pyridine is allowed to stand at room temperature for 2 hours and then diluted with ice water. The precipitate thus formed is recovered by filtration and crystallized from dilute acetone and then from methanol to yield 9,10-seco-3-acetoxy-1,3,5(10)-androstatriene-9,17-dione which melts at about 145–147°.

The initial ether solution of the residue, from the methylene chloride extracts of the fermentation mixture remaining after the alkaline extraction described above, is dried over sodium sulfate and the ether removed in vacuo. The residue is dissolved in 100 parts by volume of benzene and chromatographed on 1000 parts by weight of silica gel. The chromatographic column is washed with 12,000 parts by volume of 5% ethyl acetate in benzene and then eluted with 15,000 parts by volume of 10% ethyl acetate in benzene. The solvents are removed from the eluate in vacuo and the residue crystallized from a mixture of acetone and ether to yield recovered starting material, 4-androstene-3,17-dione.

Further elution of the chromatographic column with 20,000 parts by volume of 10% ethyl acetate in benzene, removal of the solvents from the eluate and crystallization of the residue from acetone and ether yields 1,4-androstadiene-3,17-dione which melts at about 142–143.5°.

Example III

The methylene chloride solution from Preparation D is evaporated to dryness and the residue dissolved in 250 parts by volume of ether. The ether solution is washed with 10% sodium chloride solution and then extracted with two 25 parts by volume portions of Claisen's alkali. The alkaline extract is cooled with ice and acidified with hydrochloric acid. The resulting suspension is stirred and the crystalline product which forms is recovered by filtration, washed with water, dissolved in 50 parts by volume of 4% aqueous sodium hydroxide solution, treated with activated carbon, filtered and then the filtrate neutralized with acetic acid. The 9,10-seco-3-hydroxy-1,3,5(10)-androstatriene-9,17-dione thus produced melts at about 120–126° and on treatment with pyridine and acetic anhydride as described above is converted to 9,10-seco-3-acetoxy-1,3,5(10)-androstatriene-9,17-dione which melts at about 144–146.5°.

The ether solution remaining after the alkaline extraction described above, is dried over sodium sulfate, filtered and evaporated to dryness. The residue is dissolved in 50 parts by volume of benzene and chromatographed on 350 parts by weight of silica gel. The chromatographic column is washed with 14,000 parts by volume of 5% ethyl acetate in benzene and then eluted with 3,000 parts by volume of 12% ethyl acetate in benzene. The solvents are removed from the eluate to yield recovered starting material, 4-androstene-3,17-dione. Further elution of the column with 12% ethyl acetate in benzene yields 1,4-androstadiene-3,17-dione.

Example IV

The methylene chloride solution from Preparation E above is filtered and the methylene chloride removed in vacuo. The residue is dissolved in a mixture of 200 parts by volume of ether and 10 parts by volume of benzene and extracted with two 200 parts by volume portions of 10% aqueous sodium hydroxide solution. The alkaline extract is neutralized with acetic acid and the oily residue which forms is stirred to induce crystallization. The crystalline residue is recovered by filtration to yield crude 9,10-seco-3-hydroxy-1,3,5(10)-androstatriene-9,17-dione which melts at about 124–129° and is identical with that obtained as described previously. On treatment with pyridine and acetic anhydride as described above, 9,10-seco-3-acetoxy-1,3,5(10)-androstatriene-9,17-dione is obtained which melts at about 145–147° and is identical with that previously described.

Example V

The methylene chloride solution from Preparation F is evaporated to dryness in vacuo and the residue dissolved in 500 parts by volume of ether and 200 parts by volume of benzene. The resulting solution is extracted with 10% aqueous potassium hydroxide solution and the alkaline extract neutralized with acetic acid and stirred until the oily residue thus produced crystallizes. The crystalline material is recovered and is crude 9,10-seco-3-hydroxy-1,3,5(10)-androstatriene-9,17-dione melting at about 124–131°.

Example VI

The methylene chloride extracts from Preparation G are evaporated to dryness and the residue treated with 300 parts by volume of ether. The mixture is filtered and the insoluble residue remaining is crystallized from dilute acetone and from a mixture of acetone and petroleum ether to yield 9-hydroxyandrostenedione which melts at about 222–223.5° and exhibits an extinction coefficient of about 15,600 at about 241.5 millimicrons.

The ether filtrate is extracted twice with 200 parts by volume portions of 10% aqueous sodium hydroxide solution and the alkaline extract neutralized with acetic acid to precipitate 9,10-seco-3-hydroxy-1,3,5(10)-androstatriene-9,17-dione which on treatment with acetic anhydride and pyridine and crystallization from acetone and from a mixture of acetone and petroleum ether yields 9,10-seco-3-acetoxy-1,3,5(10)-androstatriene-9,17-dione which melts at about 143–145.5°.

Example VII

A stock culture of *Pseudomonas cruciviae* ATTC 13262 is inoculated into 10 parts by volume of a sterile liquid medium containing 3 parts by weight of a commercial beef extract and 5 parts by weight of commercial peptone per 1000 parts by volume of tap water. The organism is permitted to grow in this medium for 72 hours at a temperature of about 25° without agitation or aeration. The culture is then transferred to 100 parts by volume of sterile medium of the same percentage composition contained in a 500 parts by volume container which is stoppered loosely with non-absorbent cotton. The inoculated flask is incubated for 24 hours at approximately 25° on a shaking platform which oscillates at a rate of 200 r.p.m.

A solution of 0.025 parts by weight of 19-hydroxyandrostenedione in 1 part by volume of acetone is added to the culture and incubation is continued as described above for an additional 24 hours. The mixture is extracted with 150 parts by volume of methylene chloride, the methylene chloride solution separated and evaporated to dryness in vacuo. The residue is dissolved in a mixture of benzene and ether and the solution extracted with 10 parts by volume of Claisen's alkali and the resulting alkaline extract washed with ether. The alkaline extract is diluted with 10 parts by volume of water, washed a second time with ether, cooled, acidified with hydrochloric acid and allowed to stand overnight. The crystalline precipitate which forms is recovered by filtration and sublimed at 200° under a pressure of 0.2 mm. to yield estrone, which melts at 260–262°.

Example VIII

A solution of 0.5 parts by weight of 9,10-seco-3-hydroxy-1,3,5(10)-androstatriene-9,17-dione in 2 parts by volume of acetic anhydride and 2 parts by volume of pyridine is allowed to stand at room temperature overnight. The resulting solution is filtered and the filtrate diluted with ice water. The precipitate which forms is stirred until crystalline, recovered by filtration and crystallized from dilute acetone and then from methanol to yield 9,10-seco-3-acetoxy-1,3,5(10)-androstatriene-9,17-dione which melts at about 147–147.5°, has a specific rotation in chloroform of about +82.5°, and exhibits an extinction coefficient of about 650 at about 266 and 273 millimicrons.

Example IX

A solution of 0.5 parts by weight of 9,10-seco-3-hydroxy-1,3,5(10)-androstatriene-9,17-dione in 10 parts by volume of methanol is treated with 0.5 parts by weight of sodium borohydride while maintaining the solution in an ice bath. The mixture is then allowed to stand at room temperature for 15 minutes after which the mixture is neutralized with acetic acid and diluted with water. The aqueous mixture is extracted with ether, the ether extract dried over anhydrous sodium sulfate, filtered and evaporated to dryness. The residue is treated with 3 parts by volume of pyridine and 3 parts by volume of acetic anhydride and the mixture allowed to stand overnight at room temperature. The solution is diluted with ice and water and the crystalline residue which forms on stirring and scratching is recovered by filtration and crystallized from dilute methanol and from acetone-petroleum ether to yield 9,10-seco-3,9,17β-triacetoxy-1,3,5(10)-androstatriene which melts at about 107.5–108.5°, exhibits a specific rotation of about +24.9° in chloroform and exhibits an extinction coefficient of about 658 at about 266 and 273 millimicrons.

Example X

A solution of 0.5 parts by weight of 3-acetoxy-9,10- seco-1,3,5(10)-androstatriene-9,17-dione and 0.5 parts by weight of p-toluenesulfonic acid in 20 parts by volume of isopropenyl acetate is heated under reflux for 5 hours. The reaction mixture is then evaporated to small volume, 0.5 parts by weight of anhydrous sodium acetate added and the mixture diluted with water. The reaction mixture is extracted with ether, the ether solution washed with aqueous sodium bicarbonate solution, then with water and evaporated to dryness. The residue is dissolved in cyclohexane, filtered through magnesium silicate and the solvent removed from the filtrate to give 3-acetoxy-9,10-seco-1,3,5(10)-androstatriene-9,17-dione-9,17-dienol diacetate.

*Example XI*

A solution of 0.88 parts by weight of 9,10-seco-3-acetoxy-1,3,5(10)-androstatriene-9,17-dione in 20 parts by volume of methanol is treated with 10 parts by volume of concentrated hydrochloric acid while maintaining the mixture under an atmosphere of nitrogen. After standing for 48 hours at room temperature the crystalline residue which forms is recovered by filtration, and crystallized from acetone-cyclohexane to yield 1-hydroxy-4-methyl-1,3,5(10),9(11)-estratetraen-17-one which melts about 193.5–197°. The product exhibits a specific rotation of about +264° in chloroform and absorbs in the ultraviolet spectrum at about 255.5 millimicrons with an extinction coefficient of about 13,200, 300 millimicrons with an extinction coefficient of about 3830 and at about 310 and 265 millimicrons (shoulders).

Treatment of the product with acetic anhydride and pyridine at room temperature for 24 hours yields 1-acetoxy-4-methyl-1,3,5(10),9(11)-estratetraen-17-one which melts at about 142–143°, has a specific rotation of about +201° in chloroform and exhibits an extinction coefficient of about 12,700 at about 252 millimicrons.

*Example XII*

A solution of 0.58 parts by weight of 1-hydroxy-4-methyl-1,3,5(10),9(11)-estratetraen-17-one in 25 parts by volume of acetone is treated with 5 parts by volume of methyl iodide and 5.52 parts by weight of potassium carbonate. The resulting suspension is heated under reflux overnight while stirring. The reaction mixture is then evaporated to dryness under an atmosphere of nitrogen, diluted with water, the resulting suspension stirred thoroughly and the product separated by filtration. After washing wtih water and crystallization from dilute methanol, the product, 1-methoxy-4-methyl-1,3,5(10),9(11)-estratetraen-17-one, melts at about 123–125°, has a specific rotation of about +263.5° in chloroform and exhibits absorption in the ultraviolet at about 218 millimicrons with an extinction coefficient of about 28,900, 257 millimicrons with an extinction coefficient of 13,000, 297 millimicrons with an extinction coefficient of 3150 and shoulders at about 267 and 306 millimicrons.

*Example XIII*

A solution of 0.37 parts by weight of 1-methoxy-4-methyl-1,3,5(10),9(11)-estratetraen-17-one in 10 parts by volume of methanol is treated with a solution of 0.37 parts by weight of sodium borohydride in 2 parts by volume of water and 8 parts by volume of methanol and the resulting solution allowed to stand at room temperature with occasional stirring for 15 minutes. The excess sodium borohydride is decomposed and neutralized by the cautious addition of dilute acetic acid, the neutral solution heated on the steam bath and diluted carefully with water to incipient crystallization. The suspension is then cooled and the crystalline residue thus formed is recovered by filtration to give 1-methoxy-4-methyl-1,3,5(10),9(11)-estratetraen-17-ol which melts at about 144–145.5°, has a specific rotation of about +161.2° in chloroform and exhibits maxima in the ultraviolet absorption spectrum at about 297 millimicrons with an extinction coefficient of about 3110, 258 millimicrons with an extinction coefficient of 13,230, 220 millimicrons with an extinction coefficient of 26,350 and shoulders at about 306 and 267 millimicrons.

*Example XIV*

A stirred solution of 0.3 parts by weight of 1-methoxy-4-methyl-1,3,5(10),9(11)-estratetraen-17-ol in 5 parts by volume of anhydrous tetrahydrofuran, 5 parts by volume of anhydrous ether and 30 parts by volume of liquid ammonia is treated with 0.35 parts by weight of potassium. The resulting solution is stirred for 20 minutes, treated over a period of 5 minutes by the slow addition of a mixture of 2 parts by volume of absolute ethanol and 2 parts by volume of anhydrous ether. The ammonia is allowed to evaporate, the solvents removed by evaporation in an atmosphere of nitrogen and the residue extracted with ether. The ether solution is washed with water, treated with activated carbon, dried over anhydrous sodium sulfate, filtered and the ether removed by evaporation. The residue is crystallized from dilute methanol, and a mixture of acetone-petroleum ether to yield 1-methoxy-4-methyl-1,3,5(10)-estratrien-17-ol which melts at about 116.5–117.5° and has a specific rotation of about +185.3° in chloroform.

A solution of 0.05 parts by weight of 1-methoxy-4-methyl-1,3,5(10)-estratrien-17-ol in 3 parts by volume of acetic anhydride and 2 parts by volume of pyridine is allowed to stand at room temperature for two and one-half hours. The resulting solution is diluted with ice water and the suspension stirred until the product crystallizes. The crystalline residue is recovered by filtration, washed with water and crystallized from methanol to yield 1-methoxy-4-methyl-17β-acetoxy-1,3,5(10)-estratriene which melts at about 148.5–150°.

*Example XV*

A 10 parts by volume portion of a sterile liquid medium containing 3 parts by weight of a commercial beef extract and 5 parts by weight of commercial peptone per 1000 parts by volume of tap water is inoculated from a stock culture of Pseudomonas sp ATCC 13263. The organism is permitted to grow at a temperature of about 25° for 72 hours without agitation or aeration. The culture is then transferred to 200 parts by volume of a sterile medium of the same composition and the resulting mixture incubated for 36 hours at approximately 25° while being agitated on a shaking platform.

To the culture is added a solution of 0.05 parts by weight of 19-hydroxyandrostenedione in 2 parts by volume of acetone and incubation with continued shaking is continued for an additional 20 hours. The mixture is extracted with 300 parts by volume of methylene chloride, the methylene chloride solution separated and evaporated to dryness in vacuo. The residue is taken up in 100 parts by volume of a mixture of ether and benzene and the resulting solution is extracted with 20 parts by volume of 10% aqueous potassium hydroxide. The alkaline extract is washed with ether, diluted with 20 parts by volume of water, acidified with hydrochloric acid and allowed to stand. The precipitate which forms is recovered and sublimed at about 200° under a pressure of about 0.2 mm. to yield estrone melting at about 258–260°.

*Example XVI*

A culture of *Pseudomonas dacunhae* ATCC 13261 is prepared by inoculating a 10 parts by volume portion of sterile liquid medium containing 1.5 parts by weight of commercial beef extract and 2.5 parts by weight of commercial peptone per 500 parts by volume of water. The organism is permitted to grow in this medium for 72 hours at a temperature of about 25° without agitation or aeration. The culture is transferred to 150 parts by volume of sterile medium of the same composition and incubated for 30 hours at approximately 25° while agitating on a shaking platform. At the end of this time a solution of 0.04 parts by weight of 19-hydroxyandrostenedione in 2.5 parts by volume of acetone is added and incubation is continued with shaking for an additional 30 hours. The mixture is then extracted with 225 parts by volume of methylene chloride, the methylene chloride solution separated and evaporated to dryness. The residue is taken up in about 75 parts by volume of an ether-benzene-mixture and the resulting solution extracted with 25 parts by volume of 10% sodium hydroxide solution. The alkaline extract is washed with ether, diluted with 30 parts by volume of water, acidified with acetic acid and allowed to stand. The precipitate which forms is recovered by filtration and crystallized from dilute acetone to yield crystalline estrone melting at about 259–261°.

*Example XVII*

A stock culture of *Nocardia corallina* ATCC 13258 is inoculated into 10 parts by volume of a sterile liquid medium described above in Preparation E, footnote 7, and the organism permitted to grow for about 72 hours at a temperature of about 25° without agitation or aeration. The culture is then transferred to 100 parts by volume of a sterile medium containing 3 parts by weight of a commercial beef extract and 5 parts by weight of a commercial peptone per 1000 parts by volume of tap water and incubation continued for 24 hours at approximately 25° on a shaking platform. To this medium is then added a solution of 0.025 part by weight of 19-hydroxyandrostenedione in 1 part by volume of acetone and incubation with shaking is continued for 12 hours. The mixture is extracted with 125 parts by volume of methylene chloride, the methylene chloride solution is separated and evaporated to dryness in vacuo. The residue is treated with hot dilute acetone, filtered and the filtrate allowed to stand. The crystalline estrone which separates is recovered by filtration, and, after drying melts at 259.5–261°.

*Example XVIII*

A stock culture of *Arthrobacter simplex* ATCC 13260 is inoculated into 10 parts by volume of a sterile liquid medium containing 3 parts by weight of a commercial beef extract and 5 parts by weight of commercial peptone per 1000 parts by volume of tap water. The organism is permitted to grow in this medium for 60 hours at a temperature of about 25° without agitation or aeration. The culture is then transferred to 150 parts by volume of sterile medium of the same composition which is incubated for 16 hours on a shaking platform at 25°. To the thus produced culture is added a solution of 0.04 part by weight of 19-hydroxyandrostenedione in 2 parts by volume of acetone and incubation continued as described above for an additional 9 hours. The fermentation mixture is extracted with 250 parts by volume of methylene chloride, the methylene chloride solution separated and evaporated to dryness in vacuo. The residue is taken up in a mixture of benzene and ether and the resulting solution extracted with 20 parts by volume of 10% aqueous potassium hydroxide. The alkaline extract is washed with ether, acidified with hydrochloric acid and allowed to stand. The crystalline residue which forms is recovered by filtration and crystallized from dilute acetone to yield estrone melting at 260–262°.

*Example XIX*

A 10 parts by volume portion of a sterile liquid medium containing 3 parts by weight of a commercial beef extract and 5 parts by weight of commercial peptone per 1000 parts by volume of tap water is inoculated from a stock culture of *Nocardia corallina* ATCC 13259 and the organism permitted to grow for 65 hours at a temperature of about 25°. The culture is then transferred to 200 parts by volume of the sterile medium described in Preparation E, footnote 7. The resulting culture is incubated for 36 hours at approximately 25° while agitated on a shaking platform. A solution of 0.05 parts by weight of 19-hydroxyandrostenedione in 2 parts by volume of acetone is then added to the culture and incubation continued with agitation as described above for 8 hours. The mixture is then extracted with 350 parts by volume of methylene dichloride, the methylene dichloride extract concentrated to dryness in vacuo and the residue treated with hot dilute acetone. After filtering from insoluble material the filtrate is allowed to stand and the crystalline estrone thus produced is recovered by filtration. It melts at 258–260°.

What is claimed is:

1. The process of aromatizing ring A of androstenedione which comprises subjecting androstenedione to the action of the enzymes of *Pseudomonas dacunhae*.

2. The process of aromatizing ring A of androstenedione which comprises subjecting androstenedione to the action of the enzymes of *Pseudomonas cruciviae*.

3. The process of aromatizing ring A of androstenedione which comprises subjecting androstenedione to the action of the enzymes of Pseudomonas sp ATCC 13263.

4. The process of aromatizing ring A of androstenedione which moprises subjecting androstenedione to the action of the enzymes of *Arthrobacter simplex*.

5. The process of aromatizing ring A of androstenedione which comprises subjecting androstenedione to the action of the enzymes of *Nocardia corallina*.

6. A compound of the formula

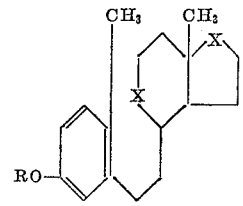

wherein X is selected from the group consisting of carbonyl, hydroxymethylene and (lower)alkanoyloxymethylene and R is selected from the group consisting of hydrogen and (lower)alkanoyl.

References Cited in the file of this patent
UNITED STATES PATENTS

| | | |
|---|---|---|
| 2,776,927 | Shull | Jan. 8, 1957 |
| 2,822,318 | Kroll et al. | Feb. 4, 1958 |
| 2,837,464 | Nobile | June 3, 1958 |
| 2,880,205 | Campbell et al. | Mar. 31, 1959 |